United States Patent
Farrugia et al.

(10) Patent No.: US 9,594,605 B2
(45) Date of Patent: Mar. 14, 2017

(54) CLIENT-SERVER VERSION CONTROL SYSTEM FOR SOFTWARE APPLICATIONS

(75) Inventors: Augustin J. Farrugia, Cupertino, CA (US); Gelareh Taban, Sunnyvale, CA (US); Amine El Kamel, San Francisco, CA (US); Gianpaolo Fasoli, Palo Alto, CA (US); Srinivas Vedula, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/297,225

(22) Filed: Nov. 15, 2011

(65) Prior Publication Data

US 2013/0125242 A1 May 16, 2013

(51) Int. Cl.
G06F 9/445 (2006.01)
G06F 9/44 (2006.01)
G06F 9/54 (2006.01)

(52) U.S. Cl.
CPC ........... *G06F 9/541* (2013.01); *G06F 8/65* (2013.01); *G06F 8/71* (2013.01)

(58) Field of Classification Search
CPC ........ G06F 9/465; G06F 9/44536; G06F 8/60; G06F 8/65; G06F 8/665; G06F 8/67; G06F 8/68; H04L 67/34; H04L 67/42
USPC .................................................. 713/150–152
See application file for complete search history.

(56) References Cited

U.S. PATENT DOCUMENTS

| | | | |
|---|---|---|---|
| 5,951,639 A * | 9/1999 | MacInnis | 725/70 |
| 6,006,034 A * | 12/1999 | Heath | G06F 8/65 717/170 |
| 6,684,328 B2 * | 1/2004 | Matsuura | 713/100 |
| 6,748,532 B1 | 6/2004 | Digiorgio et al. | |
| 6,970,849 B1 * | 11/2005 | DeMello et al. | 705/52 |
| 7,930,273 B1 * | 4/2011 | Clark et al. | 707/638 |
| 8,001,083 B1 * | 8/2011 | Offer | 707/636 |
| 8,126,845 B2 | 2/2012 | Freedman | |
| 8,465,164 B2 * | 6/2013 | Martin et al. | 359/883 |
| 8,490,077 B2 * | 7/2013 | Miranda-Steiner | G06F 8/65 709/220 |
| 2001/0029178 A1 * | 10/2001 | Criss | G06F 8/65 455/419 |
| 2002/0002673 A1 * | 1/2002 | Narin | 713/152 |
| 2002/0048372 A1 * | 4/2002 | Toh et al. | 380/285 |
| 2003/0005178 A1 * | 1/2003 | Hemsath | 709/328 |
| 2005/0193387 A1 * | 9/2005 | Uramatsu | G06F 8/65 717/170 |
| 2006/0195820 A1 * | 8/2006 | Curtis et al. | 717/120 |

(Continued)

OTHER PUBLICATIONS

PCT International Search Report and Written Opinion of the International Searching Authority for PCT/US2012/057944 mailed Jan. 30, 2013.

(Continued)

*Primary Examiner* — Tae Kim (74) *Attorney, Agent, or Firm* — Blakely, Sokoloff, Taylor & Zafman, LLP (57) ABSTRACT

A software version control system manages versioned applications in a client-server computing system environment. Thereby this is a management system for computer application (software) distribution where a number of client devices coupled to a server may be executing different versions of a particular computing application. The system manages updates to the applications and enforces rules or policies to use the most recent version whenever possible.

18 Claims, 6 Drawing Sheets

(56) References Cited

U.S. PATENT DOCUMENTS

| | | |
|---|---|---|
| 2009/0037725 A1 | 2/2009 | Farrugia et al. |
| 2009/0063584 A1* | 3/2009 | Abzarian .................. G06F 8/71 |
| 2010/0031051 A1 | 2/2010 | Machani et al. |
| 2010/0031366 A1* | 2/2010 | Knight .................. G06Q 10/10 |
| | | 726/26 |
| 2010/0281102 A1* | 11/2010 | Chinta et al. ................ 709/203 |

OTHER PUBLICATIONS

Weis et al., Security and Privacy Aspects of Low-Cost Radio Frequency Identification Systems, 2004, 12 pages.
International Preliminary Report on Patentability for corresponding International Application No. PCT/US2012/057944, mailing date May 30, 2014, 7 pages.

\* cited by examiner

FIG. 1

| Server Application | Client Application | Client O.S. | Version Reports | Comment |
|---|---|---|---|---|
| Version 1 | Version 1 | Version 1 | Used = 1<br>Available = 1 | The server verifies that the version used matches the requirements. |
| Version 1 | Version 1 | Version 1 & 2 | Used = 1<br>Available = 1 & 2 | The server verifies that the version used matches the requirements. The server can deploy the newer version of the security. |
| Version 1 | Version 1 & 2 | Version 1 | Used = 1<br>Available = 1 | This is a strange configuration that does not fulfill the good practices. However, the server verifies that the version used matches the requirements. |
| Version 1 | Version 1 & 2 | Version 1 & 2 | Used = 2<br>Available = 1 & 2 | The server does not support the security. This is a strange configuration that does not fulfill the good practices. |
| | | | | Initial Case |

FIG. 2

| Server Application | Client Application | Client O.S. | Version Reports | Comment |
|---|---|---|---|---|
| Version 2 | Version 1 | Version 1 | Used = 1<br>Available = 1 | This is a strange and invalid configuration that does not fulfill the good practices. |
| Version 2 | Version 1 | Version 1 & 2 | Used = 1<br>Available = 1 & 2 | This is a strange and invalid configuration that does not fulfill the good practices. |
| Version 2 | Version 1 & 2 | Version 1 | Used = 1<br>Available = 1 | This is a strange and invalid configuration that does not fulfill the good practices. |
| Version 2 | Version 1 & 2 | Version 1 & 2 | Used = 2<br>Available = 1 & 2 | The server verifies that the version used matches the requirements. |
| New version | | | | without server compatibility |

FIG. 3

| Server Application | Client Application | Client O.S. | Version Reports | Comment |
|---|---|---|---|---|
| Version 1 & 2 | Version 1 | Version 1 | Used = 1<br>Available = 1 | This is a strange configuration that does not take advantage of the newer version. It does not fulfill the good practices. |
| Version 1 & 2 | Version 1 | Version 1 & 2 | Used = 1<br>Available = 1 & 2 | This is a strange configuration that does not take advantage of the newer version. It does not fulfill the good practices. |
| Version 1 & 2 | Version 1 & 2 | Version 1 | Used = 1<br>Available = 1 | The server verifies that the version used matches the requirements because the older version is only available. |
| Version 1 & 2 | Version 1 & 2 | Version 1 & 2 | Used = 2<br>Available = 1 & 2 | The server verifies that the version used matches the requirements (Assumption 1). |

New version with server compatibility

FIG. 4

| Server Application | Client Application | Client O.S. | Version Reports | Comment |
|---|---|---|---|---|
| Version 1 | Version 1 | Version 1 | Used = 1<br>Available = 1 | The server verifies that the version used matches the requirements. |
| Version 1 | Version 1 | Version 1 & 2 | Used = 1<br>Available = 1 & 2 | The server verifies that the version used matches the requirements. |
| Version 1 & 2 | Version 1 & 2 | Version 1 | Used = 1<br>Available = 1 | The server verifies that the version used matches the requirements. |
| Version 1 & 2 | Version 1 & 2 | Version 1 & 2 | Used = 2<br>Available = 1 & 2 | The server verifies that the version used matches the requirements (Assumption 2). |
| Version 2 | Version 2 | Version 1 & 2 | Used = 2<br>Available = 1 & 2 | The server verifies that the version used matches the requirements. Needs the OS update first. |
| Good practices implementation |||||

CLIENT-SERVER VERSION CONTROL SYSTEM FOR SOFTWARE APPLICATIONS

FIELD OF THE INVENTION

This invention relates to computers and computer networks and more particularly to maintaining compatibility between versions of distributed computer software applications.

BACKGROUND

As is well known in the computer field, client-server computing architectures separate a client from a server and are generally implemented over computer networks such as the Internet, but not so limited. Each client or server connected to a computer network is also referred to as a "node". The basic type of client-server architecture employs two types of nodes which are clients and servers. Note that in this context the terms "client" and "server" generally refer to software rather than the underlying computing platforms or devices or hardware, which are also sometimes referred to as "clients" and "servers". This architecture allows computing devices to share files and resources. Each instance of the client software can send data requests to one or more connected servers. In turn, the servers accept these requests, process them, and return the requested information to the client. The clients are sometimes web browsers but not necessarily. In the present case the clients are generally not generic web browsers, however. Servers typically include web servers, database servers, and email servers.

Client-server architecture enables the roles and responsibilities of the computing system to be distributed among several independent computer platforms that are coupled only through the network. Typically the data is stored on the server platforms, which generally have greater security controls than do most clients.

In a somewhat related field, the protection of digital content transferred between computers over networks such as from a server to a client is important for many enterprises. Enterprises attempt to secure this protection by implementing some form of Digital Rights Management referent process. The DRM process often involves encrypting the piece of content (e.g., encrypting the binary form of the content) to restrict usage to those who have been granted a right to the content.

Cryptography is a traditional method of protecting data in transit across a network. In its typical application, cryptography protects communications between two mutually trusting parties from thievery. However, in many digital file transfer applications today, e.g., for the transfer of audio or video content, the party that receives the content may try to break the DRM encryption that has been earlier applied to the content.

In many known DRM systems today, the weakest link in the resulting security is not the encrypted data but rather the overall cryptographic process. For instance, one of the more successful DRM systems distributes music and video programs on line. This DRM system distributes to a user's computer content that has been similarly encrypted for all users. The user's computer then decrypts received content, generates local keys for encrypting the content, and uses these locally generated keys to re-encrypt the content.

The example of DRM systems here is merely an example where the DRM system is a client application in terms of the portion of the DRM system resident at the client platform. A complementary portion of the DRM system is resident at the server platform. It is the nature of such DRM systems that they are frequently updated or changed, usually to enhance security or for other reasons. This introduces another known technology, which is referred to as Version Control or Revision Control, which is an aspect of software configuration management. This generally is the management of change to documents, programs (including so-called software applications), and other information stored as computer files. It is commonly used in software development where a number of people may be altering the same files. A version change is usually identified by a number or letter code, termed a revision number, revision level or the revision such as V1, V1.2, V2, etc.

There are a number of known version control systems which typically run as stand-alone applications but may be embedded in various types of software of other types and in various content management systems. Typically such versions are backward-compatible, but not always. It is common for multiple versions of the same software application to be employed at different clients and for some clients to be using, for instance, version 1 while other clients are using version 2. At the same time the associated server may be using different versions.

There are known version controls for application servers which may deploy sets of applications to many client devices. These typically manage updates to the applications and provide other management to deployment of the applications. The client device may in turn include an application management client that communicates with the server in terms of managing the versions. The management client may add or remove applications in the client device based on a policy received from the server and may query the server to determine a currently available application.

Thus, the server may be able to install and serve new versions of an application at the clients while simultaneously serving an older version of the same application. However, generally such systems do not also provide the security aspects, for instance in DRM, which imposes its own restrictions as identified by the present inventors.

SUMMARY

The present inventors have identified that generally version control is not always suitable or optimum for distribution of certain types of applications, especially those involving security of content such as DRM. However, the present system and method are not limited to DRM or any specific type of application distribution. Therefore, the present system is directed to providing optimized version control in a client-server computing architecture. The present system is such that it always prefers to use the latest version of the application. This is especially advantageous when the application is security-related, such as a DRM application, where possibly the earlier version has been penetrated by hackers.

Further, the present system is intended to be resistant to a declassification attack whereby the system forces use of an older version of the application, for instance a DRM application. Further, the system implements an optimized approach, which provides the maximum possible level of security in terms of version control. The goal is to maximize security (or more generally, the most recent version of an application) without hindering the client's freedom to operate, even if they may not have the latest version of the application. This approach may not be suitable for high-security applications such as transfers of money or important information. It is very useful for distribution of audio and video content where ease of access is more important than the security of the content. The present system may tolerate sub-optimal security, while trying to maximize security overall. Of course, the present system is not limited to distribution of DRM-type or other security oriented software applications (computer programs).

DETAILED DESCRIPTION

Figure 1:
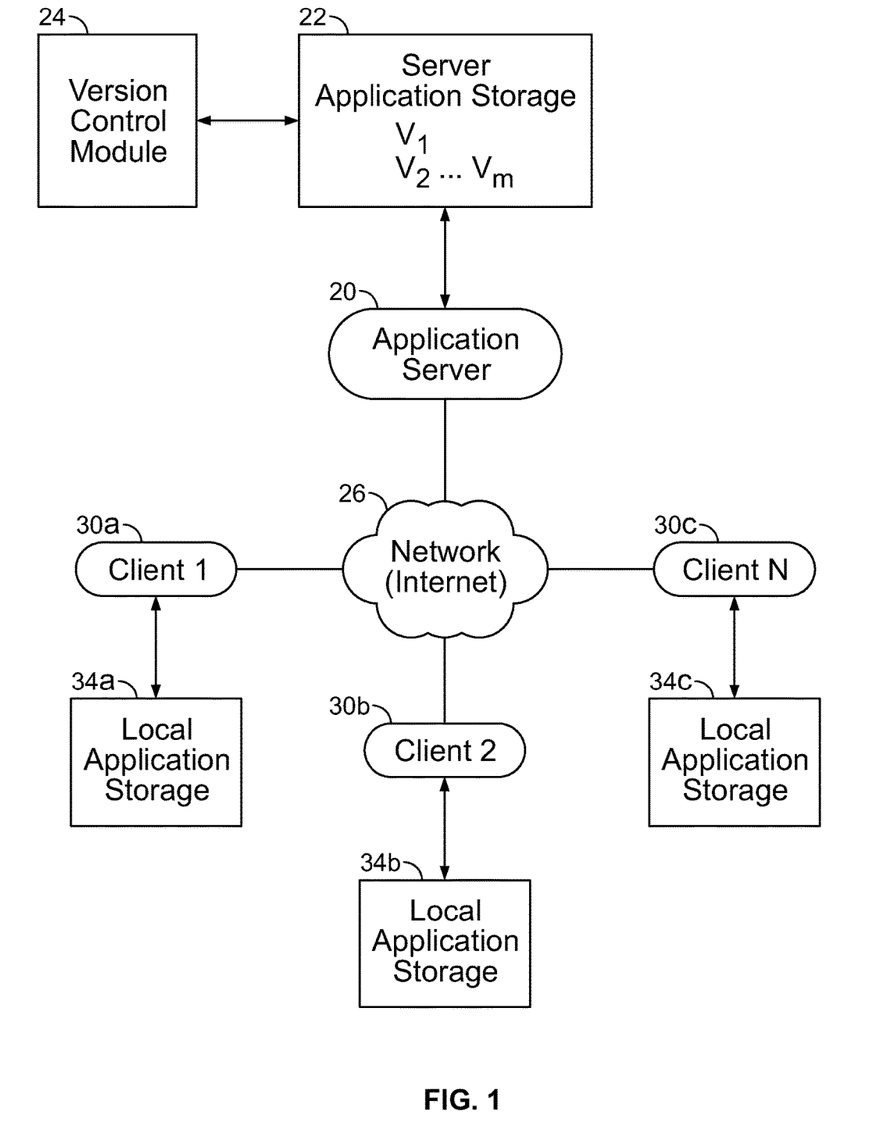
FIG. 1 shows a client-server architecture in accordance with the invention.

FIG. 1 shows a mostly conventional client-server architecture, including an application server 20, whose purpose is to distribute in this case application software to various clients which are designated Client 1 30a, Client 2 30b and Client N 30c, which are connected to the application server conventionally via a computing network such as the Internet 26 but not so limited. There may be several such application servers 20 and many, even millions, of such clients. Each client has an associated local application storage or computer memory, respectively 34a, 34b and 34c. Each client platform can thereby store several applications. In this situation the application may be or include DRM functionality and may well include other functionalities such as allowing downloading and playing of audio and video content. In that case, the application server may also have an associated content server (not shown) which provides the content which is downloaded under control of the application server to the various clients.

Associated with the application server is a server application storage, which is a computer memory which stores a number of versions of a particular application, here designated V1, V2, . . . VM. This is commonly the case where a number of versions of a particular application are active and in use at any one time. Similarly, each client may store one or more versions of each application. Also provided is a version control module 24 which is another computer program associated with the application server which carries out the functionality in accordance with the invention.

Module 24 generally manages version distribution to implement certain preferences or policies. As described above, the preferences or policy carried out in accordance with the invention are: First, it is always preferred that the client use the latest version of the application, that is the newest in time or most recently updated version of a particular application. Similarly, the system should be resistant to a so-called "declassification attack", which occurs when for some reason there is a requirement to use an older version of the application such as, for instance, a client or server which does not have the newest version of the application. Next, the goal is to implement if possible the optimized practices or best practices in terms of trying to insure that the first goal, which is the latest version, occurs as frequently as possible.

Figure 2:
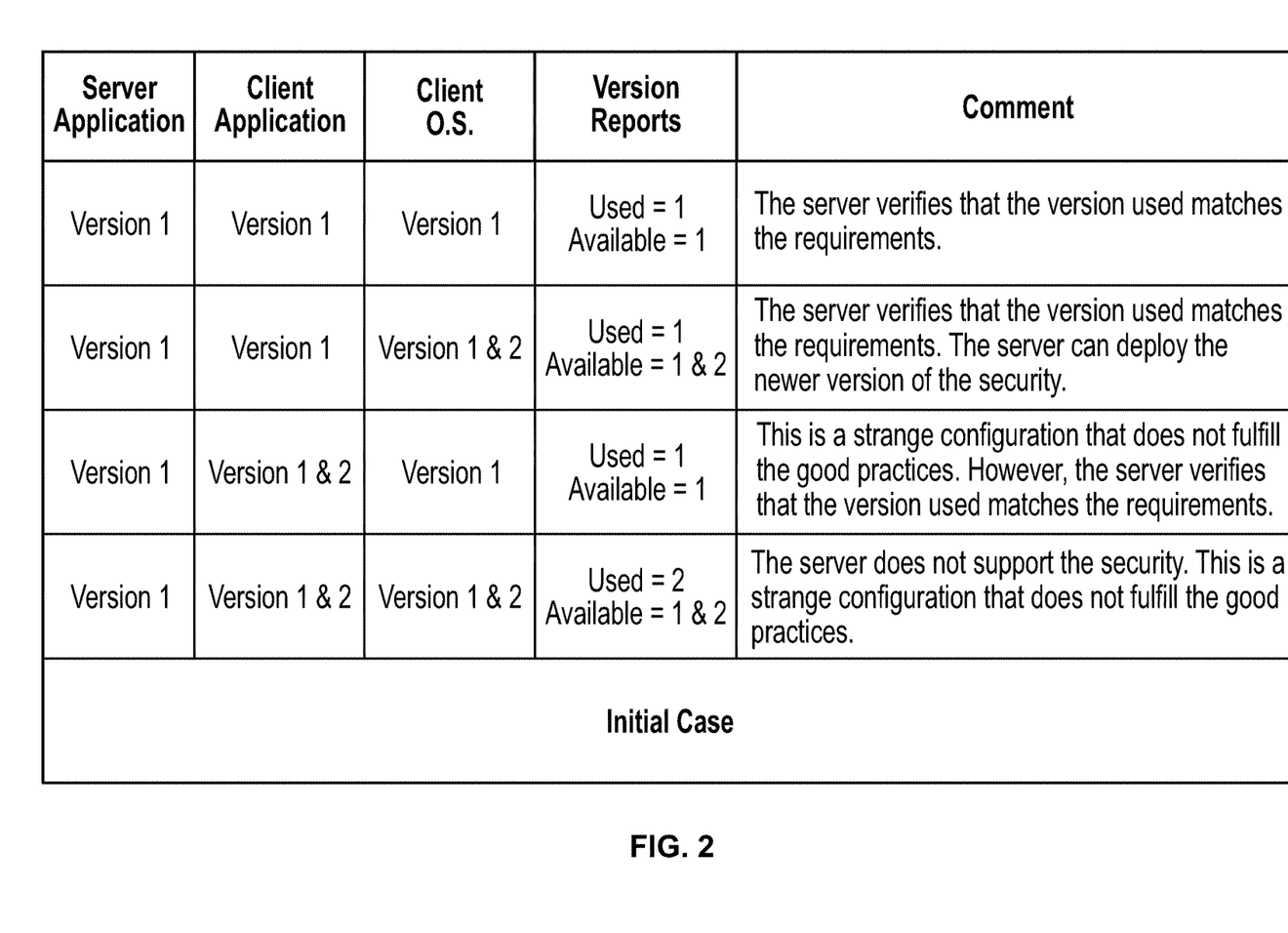
FIG. 2 shows in tabular form various possibilities of version distribution and illustrates the technical problem to which the present invention is directed.

Thus FIG. 2 illustrates in tabular form an initial case where the server only supports version 1 of a particular application. Each of the first three columns of FIG. 2 as indicated across the top row provides information about version distribution for one involved computing entity. The first column shows the application versions as supported by the server, which here only supports version 1. In other words, there has been no update to version 2 released to the server. Note that such updates are generally controlled by some external entity and may not reach each server or client at the same time. The second column is the active application version(s) at the client. In some cases a client or a server may be able to use more than one version. The third column indicates the version of the application supported by the operating system (O.S.) associated with a particular client.

The fourth column is a report of the version control for a particular configuration of the first three columns as explained below. The last column is comments explaining each configuration in terms of adherence to policies or goals. Thus the second row of FIG. 2 involves a situation where the server is executing version 1 of an application, the client is running version 1, and the client operating system is also supporting version 1. In that case, the report is that version 1 is used and (as far as the O.S. is concerned) version 1 is the only available version. As indicated by the comment, the version control module at the server thereby verifies that the version used by both the server and the client matches requirements.

In the second case, which is the third row of FIG. 2, the server application is version 1, the client application is version 1, and the operating system supports versions 1 and 2. In this case, the report is that only version 1 is used but both versions 1 and 2 are available. In this case, again the version used matches requirements and further, it is possible for the server to deploy the newer version of the application (which is version 2) to the client and server.

In the fourth row of FIG. 2, the client application supports versions 1 and 2, but the operating system only version 1. As indicated this is a strange or undesirable or possibly insecure configuration. However, it is still operable, since in fact both the server and client can use version 1. This violates the first constraint or goal which that the most recent version of the security should be used if available.

The last case in FIG. 2 is that the server does not support the latest version of the security module (which is version 2) and thus this is considered poor or strange since as far as the client and operating system are concerned, version 2 is supported and version 2 is used, but the server only allows use of version 1.

Figure 3:
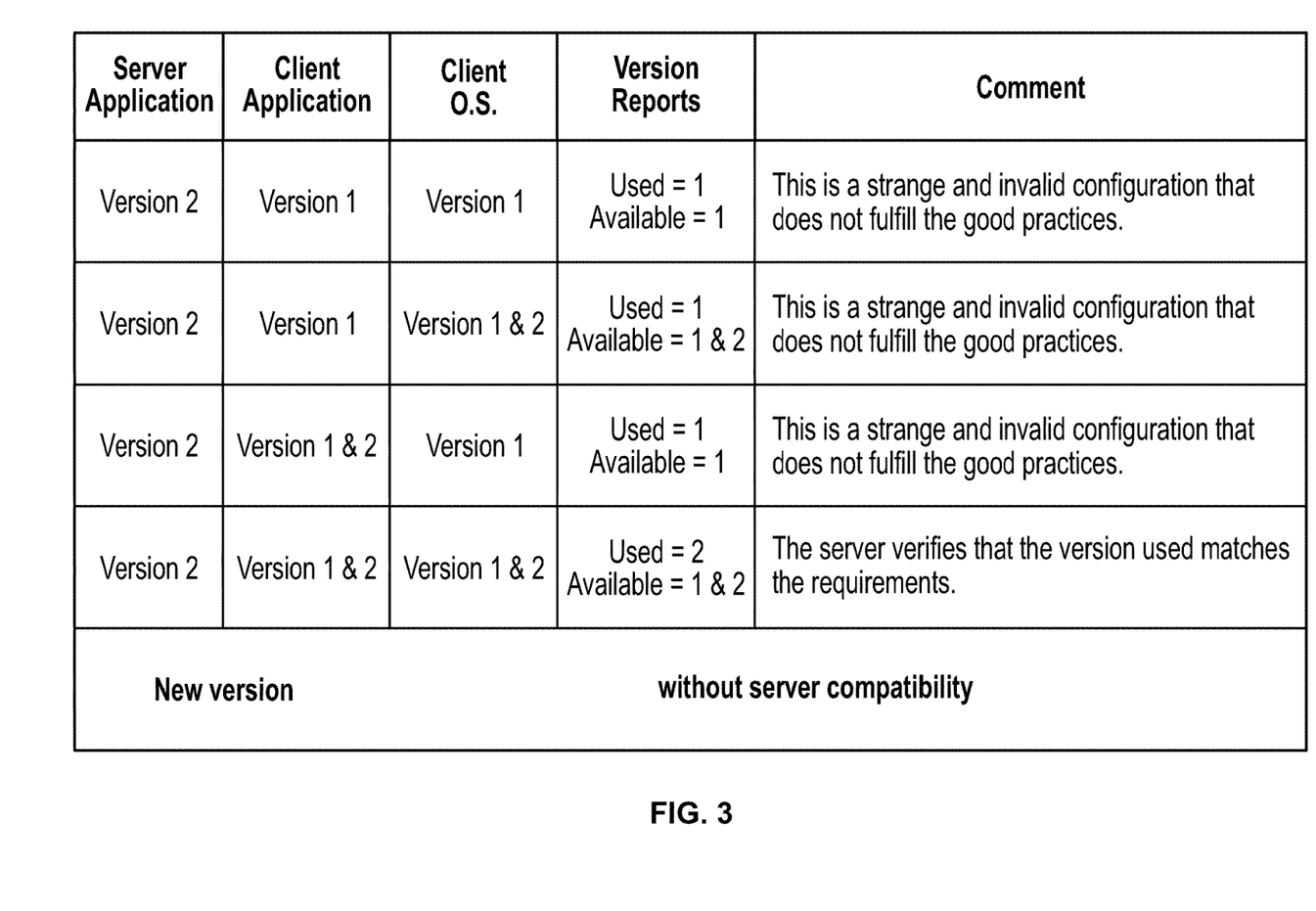
FIG. 3 shows one type of version control without server compatibility.

FIG. 3 is similar to FIG. 2 in terms of its organization. However, here there has been a release or deployment of the newer version 2 to the server and there is also an absence of server backwards compatibility meaning that the server cannot now use version 1. Here, each of the first three cases is considered an invalid or poor or suboptimum configuration since at least one of the three entities is capable of supporting version 2, but one does not, resulting in defaulting to version 1 rather than the preferred version 2. Only the last case, where each entity is capable of supporting or executing version 2, is optimized and meets the goal of using the latest version.

Figure 4:
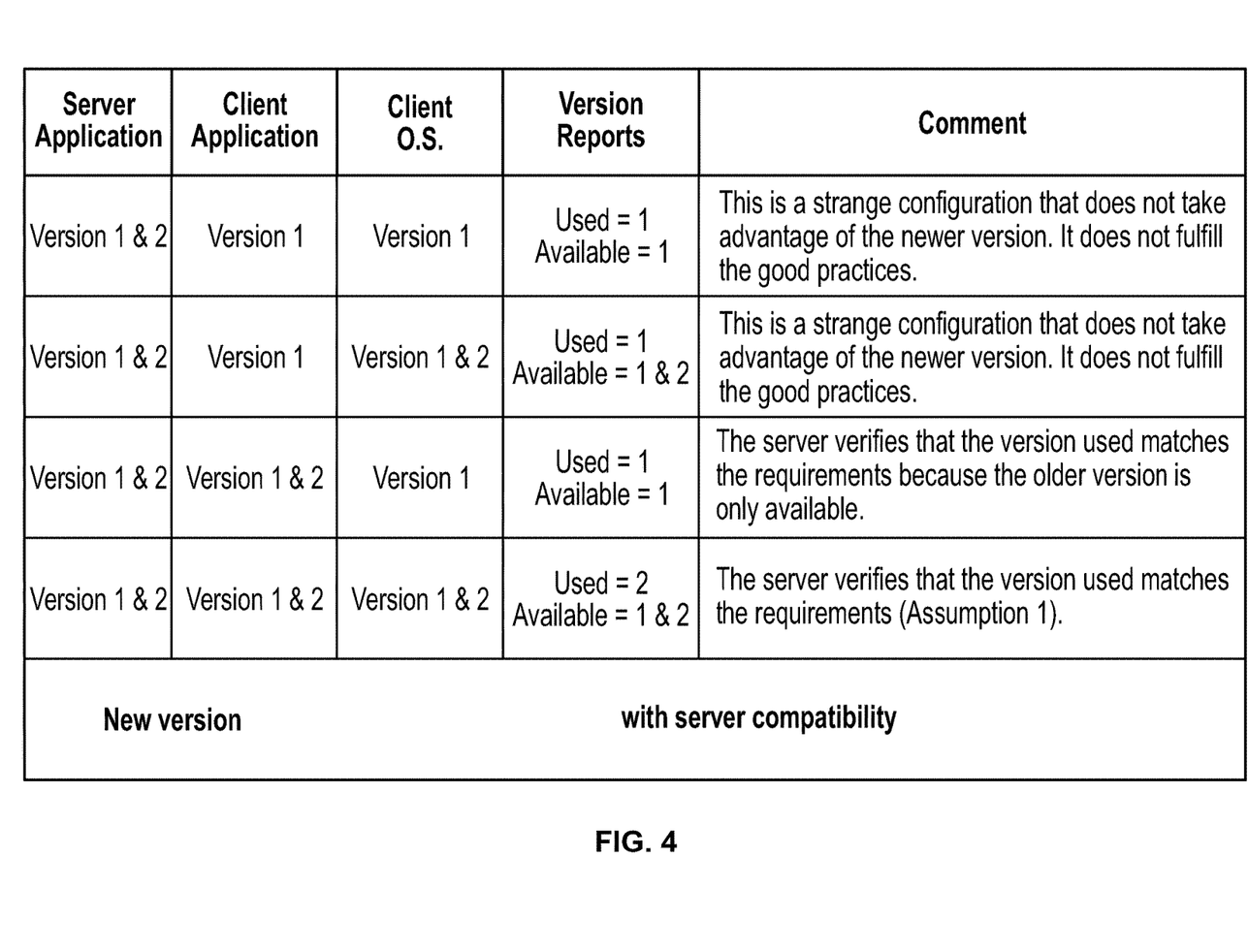
FIG. 4 shows another type of version control with server compatibility.

FIG. 4 is similar to the situation of FIG. 3, but here there is serve backwards compatibility in terms of the versions. Here, each of the first two cases is considered a strange or undesirable configuration, because it does not use the latest version of the application. That's because in each of these cases there is a forced use of version 1 rather than the preferred version 2. And in the third case here, version 1 must be used because the operating system is only capable of supporting version 1. Only the last case is the optimized version where all entities can use or support version 2 and hence that is used.

Hence, in FIG. 3 the server only can support one version. In FIG. 4 the server can support both versions (or M versions where may be 2, 3, 4, etc., as is more common and as in FIG. 1).

Figure 5:
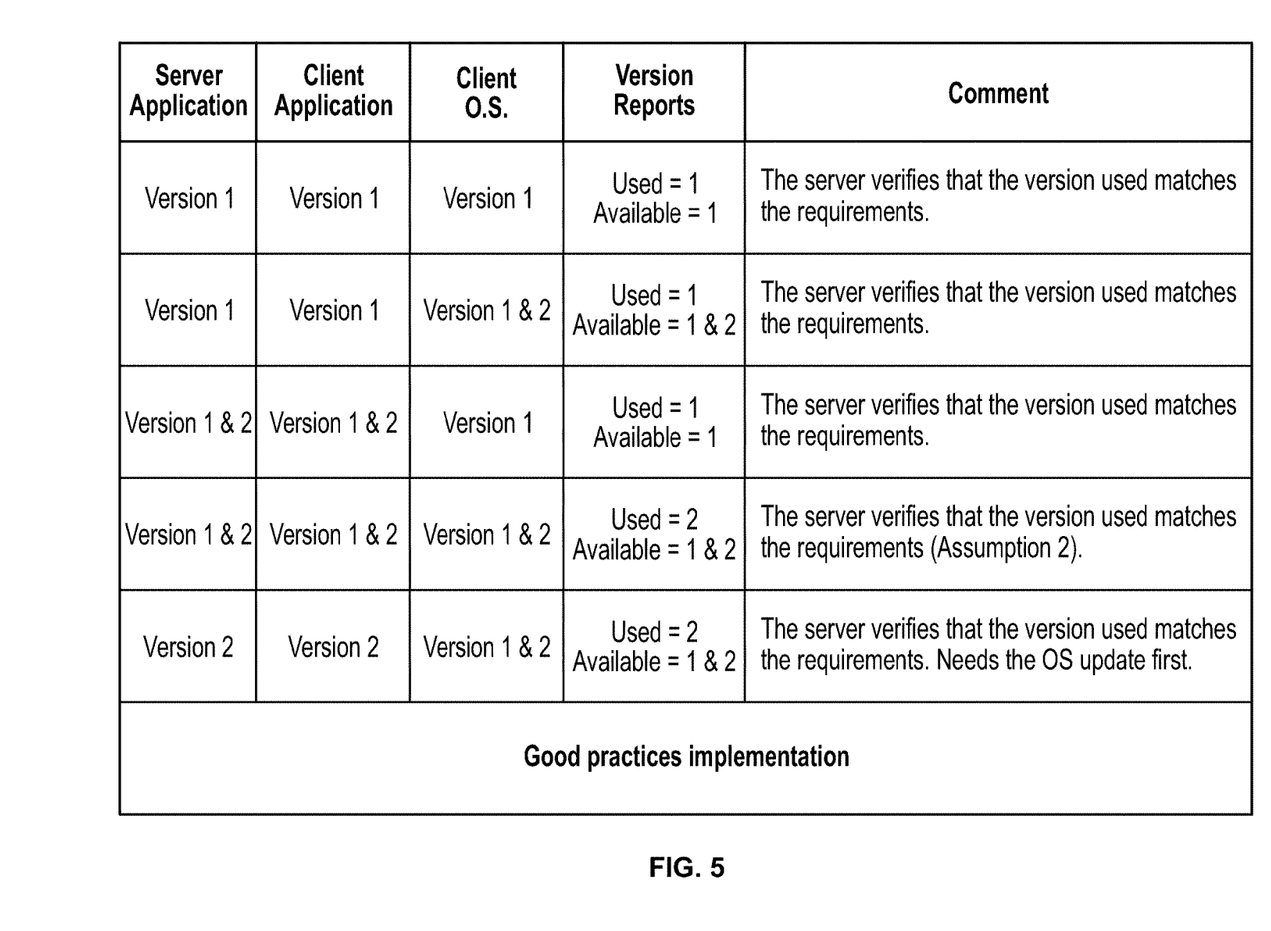
FIG. 5 shows an optimized version control.

FIG. 5 illustrates the overall preferred situation in accordance with the invention, with the server in some cases deploying one version and in other cases deploying both versions. In this case, in each of the first three cases version 1 is used because one of the relevant entities only uses or supports version 1, whereas in the last two cases version 2 is used since all entities use or support version 2. This involves suitable interaction to update the operating system of each client.

Figure 6:
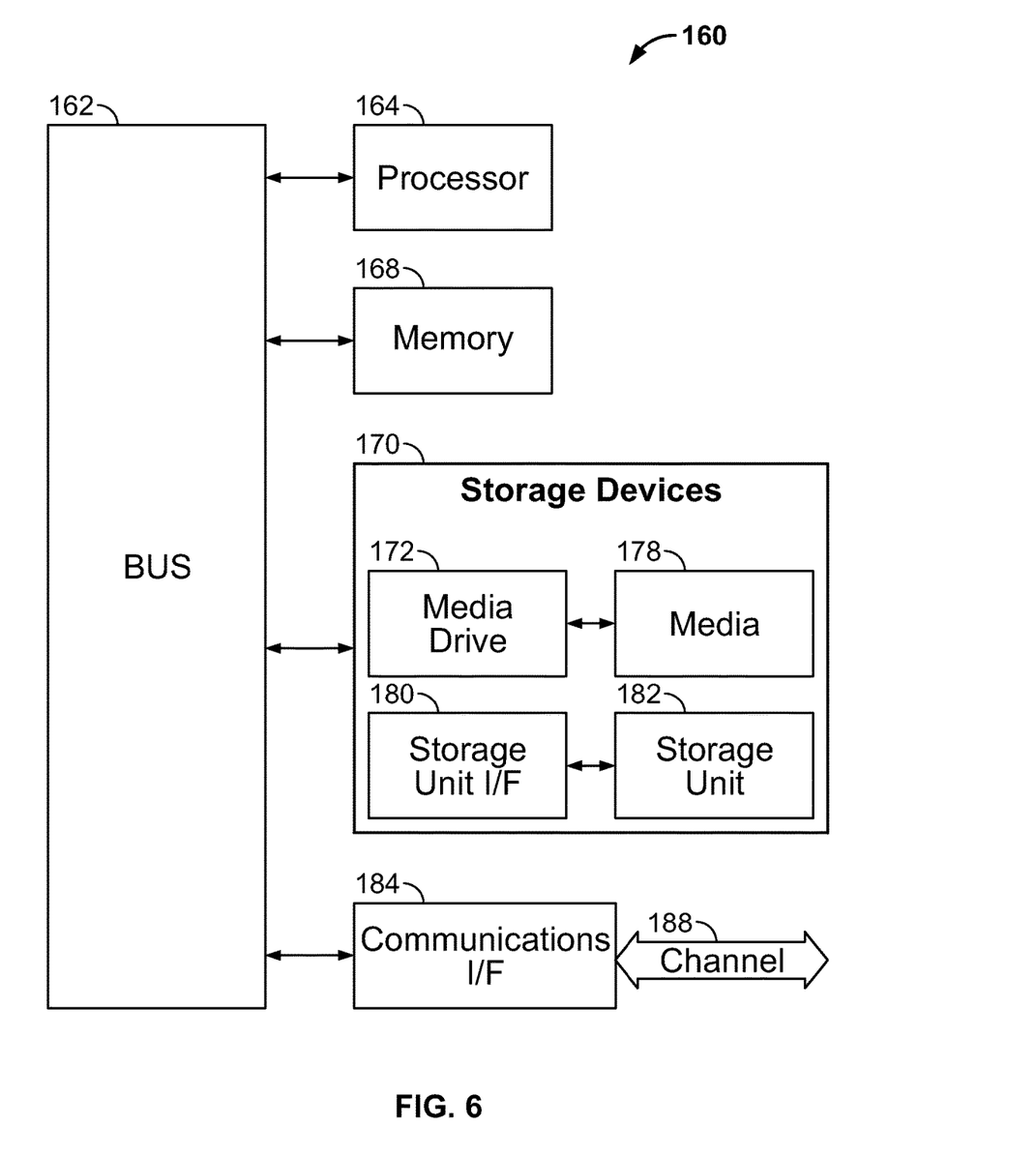
FIG. 6 shows in a block diagram a computing system usable in accordance with the invention for the client or server platform.

FIG. 6 shows in a block diagram relevant portions of a conventional computing device (system or platform) 160 in accordance with the invention which carries out the method and its associated processes as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity.

FIG. 6 thus illustrates detail of a typical and conventional embodiment of computing system 160 that may be employed to implement processing functionality in embodiments of the invention as indicated in FIGS. 2-5 for the server platform and user device. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164. Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168, such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 162 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 162. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184. Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A non-transitory computer readable storage medium storing instructions which, when executed by a processing system having one or more processors, causes the processing system to perform operations for managing a digital rights management (DRM) enabled media application having a plurality of versions, the DRM enabled media application to enable distribution and playback of DRM enabled media content to a set of client computing devices, the operations comprising:
   querying a version control module of a server computing device to determine one or more versions of the plurality of versions of the DRM enabled media application that are supported by the server computing device, wherein the server computing device supports at least two versions of the DRM enabled media application, the server computing device executes a server instance of the DRM enabled media application, and each client computing device executes a client instance of the DRM enabled media application;
   without requiring distribution of additional versions of software to the set of client computing devices, determining which of the plurality of versions of the DRM enabled media application are currently resident on the set of client computing devices and which of the plurality of versions of the DRM enabled media application are supported by an operating system of the client computing devices in the set of client computing devices;
   for each client computing device in the set of client computing devices, selecting a most recent version of the plurality of versions of the DRM enabled media application that resides on the client computing device, that is currently supported by the server computing device, and that is currently supported by the operating system of the client computing device;
   directing each client computing device and the server computing device to use the selected most recent version of the plurality of versions of the DRM enabled media application, wherein the version control module of the server computing device verifies that the selected most recent version of the plurality of versions is to be used; and
   deploying a server instance of a second version of the DRM enabled media application to the server computing device from an external source in response to determining that an operating system of one or more of the client computing devices in the set of client computing devices supports a first and second version of the client instance of the DRM enabled media application and that the second version is not supported by the server computing device.

2. The non-transitory computer readable storage medium of claim 1, further comprising:
   on at least one of the client computing devices in the set of client computing devices, receiving a set of cryptographic keys to decrypt and play the DRM enabled media content via the DRM enabled media application.

3. The non-transitory computer readable storage medium of claim 2, wherein the media content includes audio content.

4. The non-transitory computer readable storage medium of claim 3, wherein the media content additionally includes video.

5. The non-transitory computer readable storage medium of claim 4, wherein the set of client computing devices includes at least one mobile client computing device.

6. The non-transitory computer readable storage medium of claim 5, including instructions to perform further operations comprising:
   reporting, via a display device of at least one client computing device in the set of client computing devices, the most recent version of the plurality of versions that is common to the server computing device, the at least one client computer device, and the operating system of the at least one client computer device; and
   reporting at a display device of the at least one client computing device whether any other versions of the DRM enabled media application are available that are supported by the at least one client computing device and the operating system of the at least one client computing device.

7. A system comprising:
   a server device including server application storage and media content storage, the server application storage to store a server instance of plurality of versions of a digital rights management (DRM) enabled media application and the media content storage to store DRM protected content for distribution to multiple client devices;
   a first client device having a first operating system and local application storage to store at least one version of a client instance of the DRM enabled media application;
   a second client device having a second operating system and local application storage to store at least one version of the client instance of the DRM enabled media application; and
   a version control module executing on one or more processors of the server device, the version control module configured to verify that the most recent version of the plurality of versions of the DRM enabled media application is to be used, wherein prior to transmitting a set of cryptographic keys to a first and second client device, and without requiring distribution of additional versions of software to the first and second client devices, the version control module is to:
      determine which of the plurality of versions of the DRM enabled media application is supported by the server device;
      determine which of the versions currently reside in local application storage on the first client device;
      determine which of the versions currently reside in local application storage on the second client device;
      determine which of the versions is supported by the first operating system;
      determine which of the versions is supported by the second operating system;
      determine a first set of common versions that are supported by the server device, resident on the first client device, and supported by the first operating system;

determine a second set of common versions that are supported by the server device, resident on the second client device, and supported by the second operating system;

determine which of the versions in the first set of common versions is most recent;

determine which of the versions in the second set of common versions is most recent;

direct the server device to use the most recent common version in the first set of common versions with the first client device;

direct the server device to use the most recent common version in the second set of common versions with the second client device;

verify that the most recent version of the plurality of versions is to be used with each client device; and deploy the server instance of the second version of the DRM enabled media application to the server device from an external source in response to a determination that the first or second operating system supports a first and second version of the client instance of the DRM enabled media application and that the second version is not supported by the server computing device.

8. The system as in claim 7, wherein the version control module further to report which version is the most recent common version in each of the first and second set of common versions.

9. The system as in claim 7, wherein the server device is further configured to distribute DRM encrypted media content to the first and second client device.

10. The system of claim 9, wherein the server device is further configured to deliver of cryptographic keys to the first and second client device, for decrypting the DRM encrypted media content.

11. The system of claim 10, wherein the DRM encrypted media content includes audio and video content.

12. The system of claim 11, wherein the first or second client device is a mobile computing device.

13. A method for managing a digital rights management (DRM) enabled media application having a plurality of versions, the DRM enabled media application to enable distribution and playback of DRM enabled media content to a set of client computing devices, the method comprising:

querying a version control module of a server computing device to determine one or more versions of the plurality of versions of the DRM enabled media application that are supported by the server computing device, wherein the server computing device supports at least two versions of the DRM enabled media application, the server computing device executes a server instance of the DRM enabled media application, and each client computing device executes a client instance of the DRM enabled media application;

without requiring distribution of additional versions of software to the set of client computing devices, determining which of the plurality of versions of the DRM enabled media application is currently resident on the set of client computing device and which of the plurality of versions of the DRM enabled media application is supported by an operating system of the client computing devices in the set of client computing devices;

for each client computing device in the set of client computing devices, selecting a most recent version of the plurality of versions of the DRM enabled media application that resides on the client computing device, that is currently supported by the server computing device, and that is currently supported by the operating system of the client computing device;

directing each client computing device and the server computing device to use the selected most recent version of the plurality of versions of the DRM enabled media application, wherein the version control module of the server computing device verifies that the selected most recent version of the plurality of versions is to be used; and deploying a server instance of a second version of the DRM enabled media application to the server computing device from an external source in response to determining that an operating system of a client computing device in the set of client computing devices supports a first and second version of the client instance of the DRM enabled media application and that the second version is not supported by the server computing device.

14. The method of claim 13, wherein the media content includes audio content.

15. The method of claim 14, wherein the media content additionally includes video.

16. The method of claim 15, further comprising:

reporting, via a display device of at least one client computing device in the set of client computing devices, the most recent version of the plurality of versions that is common to the server computing device, the at least one client computer device, and the operating system of the at least one client computer device; and reporting at a display device of the at least one client computing device whether any other versions of the DRM enabled media application are available that are supported by the at least one client computing device and the operating system of the at least one client computing device.

17. The method of claim 16, wherein the at least one client computing device is a mobile client computing device.

18. The method of claim 17, further comprising:

on at least one of the client computing devices in the set of client computing devices, receiving a set of cryptographic keys to decrypt the DRM enabled media content and playing the decrypted DRM enabled media content.

* * * * *